Jan. 1, 1952     J. R. GRENIER ET AL     2,580,762
PROTECTIVE CLOSURE
Filed April 28, 1950
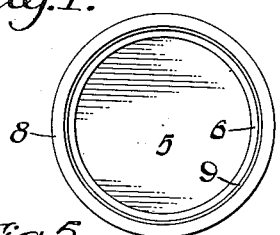
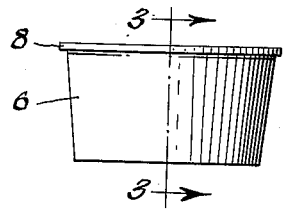
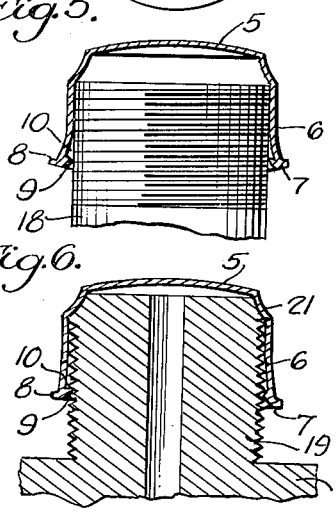
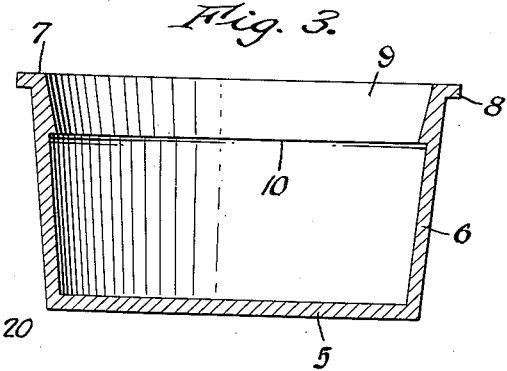
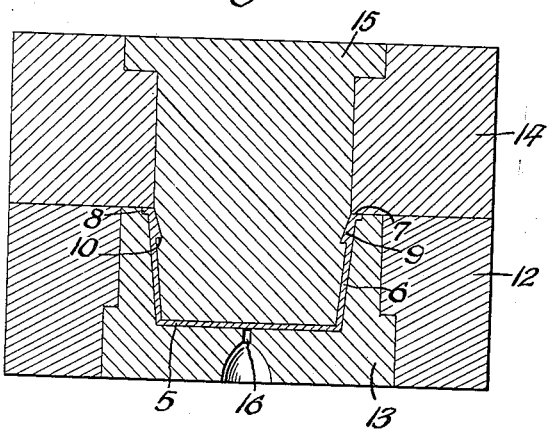
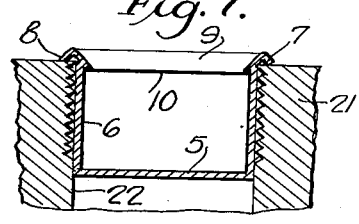
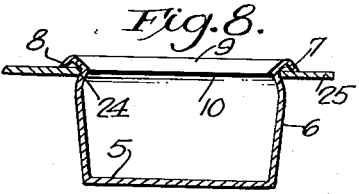
INVENTOR.
Joseph R. Grenier
BY Ernest W. Dormeyer Jr.
Popp and Sommer
Attorneys.

Patented Jan. 1, 1952

2,580,762

UNITED STATES PATENT OFFICE 2,580,762

PROTECTIVE CLOSURE

Joseph R. Grenier and Ernest W. Dormeyer, Jr., Buffalo, N. Y.

Application April 28, 1950, Serial No. 158,898

3 Claims. (Cl. 220—42)

This invention relates to a closure in the form of a combined cap and plug which can be used wherever it is desired to close an opening or to enclose the end of a projecting part, but more particularly as dust and moisture seals and shipping protectors for threads, pipe and tubing ends and the like. Among other uses are use in masking parts for paint spraying or electroplating where high temperature ovens or baths are not involved. They are also advantageously used in intraplant shipping protection and as protectors in handling and plant storage. The closures are used on and in tubing, fittings, valves, automotive, aircraft and hydraulic parts and have many other applications.

One of the principal objects of the invention is to provide a low cost, easily applied and removed closure in the form of a cap or plug which will reliably adhere to the part to be protected and provide the desired protection thereto, such as providing protection to the threads both inside and outside on said part.

Another object is to provide such a closure in which one size of closure can be used for a range of sizes of parts to be protected.

Another object is to provide such a closure which is not subject to deterioration or attack by any normally encountered chemical and is not subject to rot or mildew.

Another object is to provide such a closure which can be rapidly molded by injection molding and which in particular can be rapidly removed from the molding apparatus.

Another object is to provide a cap closure which provides an adequate seal even when applied to pipes or projections of the largest size which the cap is capable of accepting.

Another object is to provide a cup-shaped, frusto-conical closure which is made of a highly flexible plastic having good form stability and having the proper wall thickness and degree of taper to firmly adhere in good sealing relation to the part to be protected and at the same time to be capable of being easily removed therefrom.

Other objects and advantages of the invention will appear from the following description and drawings in which:

Fig. 1 is a top plan view of a combined cap and plug embodying the present invention.

Fig. 2 is a side elevational view thereof.

Fig. 3 is an enlarged vertical central section taken on line 3—3, Fig. 2.

Fig. 4 is a vertical section through the die parts used in molding of the closure forming the subject of the present invention, a closure being shown between the dies.

Fig. 5 is a cross sectional view of the combined cap and plug applied as a cap over the end of a threaded pipe.

Fig. 6 is a similar view showing cap and plug applied as a cap over a threaded male nipple.

Fig. 7 is a similar view showing the combined cap and plug applied as a plug into a generally cylindrical threaded opening.

Fig. 8 is a similar view showing the combined cap and plug applied as a plug into a circular hole through a thin wall.

The closures of the present invention are made of polyethylene, an extremely tough but flexible plastic. This practically inert material is impervious to all common chemical reagents such as solvents, sterilizing agents, caustic and acid baths and the like. It weathers well, and is vermin and fungus proof. Polyethylene has good form stability over a wide range of temperatures. Unstressed it keeps its shape to about 220° F. If subjected to stress, the maximum stress service temperature is generally about 185° F. The low temperature brittleness point is below —94° F.

The closure comprises a circular end wall 5 from the rim of which an enlarging frusto-conical wall 6 projects axially so as to provide a cup-shaped body. The enlarged rim 7 of the side wall 6 is provided with a radially, outwardly projected flange 8. This rim flange assists in the application to and removal from the part to be protected.

The closure so made of polyethylene has critical geometric proportions. To permit of adapting itself, either as a cap or as a plug, in providing the necessary seal, the thickness of the wall 6 must be in the range of from .025 to .040 inch. The degree of taper of this frusto-conical wall 6 relative to its axis is also critical, this wall taper preferably being in the order of a 10° included angle and necessarily being in the range of from 5° to 15° inclined angle. In other words, the angularity of the frusto-conical side wall 6, viewed in cross section relative to the axis thereof, is in the range of from 2.5° to 7.5°.

In the use of closure embodied in the present invention, it can be used as a cap applied to a threaded tube 18 as shown in Fig. 5. In such use the closure will fit a range of outside diameters of such tubes, the side wall 6 of the closure adjacent its bottom wall 5 expanding to the requisite degree, as illustrated in Fig. 5, to fit larger sized tubes and this bottom 5 bowing away from the tube as also illustrated in this figure. It will also be seen, as shown in Fig. 6, that the closure can similarly be fitted at the nipple 19 of a fitting 20 and which nipple can have a small conical end 21. It will also be seen, as shown in Fig. 7, that as a plug the closure can be fitted in the bore 22 of a casting 23, the closure being capable of being compressed to fit relatively small diameters of such bores 22. The closure can also be applied to the opening 24 in a thin wall 25 in which case only a ring of the material of the closure adjacent its rim is compressed, as best shown in Fig. 8. It is also desirable that the wall thickness of the end wall 5 of the radially projecting flange 8 be approximately the same as the wall thickness of the wall 6.

The depth or axial extent of the side wall 6 and hence of the cup which it forms, is also such as to provide an increase in internal diameter of this wall of from $\frac{1}{16}$ to $\frac{3}{16}$ inch at the rim of this wall as compared with its internal diameter across the end wall 5.

A further important feature of the invention resides in the provision of an annular internal integral bead 9 at the rim of the wall 6. This internal bead is wedge-shaped in cross section and is arranged to provide an abrupt annular shoulder 10 opposing the end wall 5. The height or axial extent of this integral bead 9 is from $\frac{1}{8}$ to $\frac{1}{16}$ inch and the abrupt shoulder 10 projects radially inwardly from the wall 6 from .007 to 0.10 inch.

This integral internal bead 9 within the mouth of the closure has two important advantages. It insures an adequate seal with the largest size of cylindrical projection which the cap is designed to accommodate, the abrupt annular shoulder 10 forming a hook which insures firm engagement with such a cylindrical projection. More important, this integral internal bead in the mouth of the closure, together with the abrupt shoulder 10 opposing the end wall 5, greatly facilitates the molding of the closure from polyethylene.

The closures are molded by die casting, using dies as indicated generally in Fig. 4, there being there shown a lower die holder 12 in which a female die 13 is suitably secured, and an upper die holder 14 in which the male die 15 is suitably secured. The fluid polyethylene is introduced into the molding space between the dies 13 and 15 through a small orifice 16 in the female die 13, and after the polyethylene has set, the die holders 12 and 14 are separated.

Without the provision of the internal integral bead 9 with its annular abrupt shoulder 10, great difficulty was experienced in getting the closure out of the cavity of the die 13. While little difficulty was experienced in withdrawing the male die 15, the vacuum which was formed on attempting to withdraw the closure from the cavity of the mold 13 greatly impeded the rapid removal of the product from these female dies.

By the provision of the internal beads 9 at the mouths of the closures and with their abrupt annular shoulders 10 facing the end walls 5, the removal of the product from the dies is greatly facilitated. Upon separating the die plates 12 and 14, the closures are withdrawn with the male die 15, the abrupt shoulder 10 formed on each closure providing a positive interlock with the male die for this purpose, this interlock having sufficient strength to break the vacuum tending to form between the closure and the cavity of the die 13. After the male die 15, together with the closure thereon, has been so withdrawn, it is very simple to peel the closure from the male die, the internal bead 9 being readily released from the male die.

From the foregoing, it will be seen that the present invention provides a closure which, by reason of being made of polyethylene, has a high degree of strength, flexibility and form stability to adapt itself, either as a plug or as a cap, to parts of different sizes and at even slightly different shapes and provide a firmly adherent and adequate protective seal. It will also be seen that because of this flexibility, the closures can be easily and quickly removed. The polyethylene closure must be made within the dimensional ranges indicated, namely, a wall thickness of the frusto-conical wall 6 of from .025 to .040 inch; a taper of this frusto-conical wall of from 5° to 15° inclined angle of from 2.5 to 7.5° relative to the axis of the wall; and the axial dimension of the wall 6 is preferably such that the internal diameter of the closure at its mouth is from $\frac{1}{16}$ to $\frac{3}{16}$ inch greater than the internal diameter of this wall across the end wall 5.

The barb or wedge shaped integral internal bead 9 with its abrupt shoulder 10 opposing the end wall 5 is also highly important, particularly in the injection molding of the closure, it likewise being important that this bead 9 be within the dimensions indicated, namely, an axial extent of from $\frac{1}{8}$ to $\frac{1}{16}$ inch and the shoulder 10 having a radial projection of from .007 to 0.10 inch.

We claim:

1. As an article of manufacture, a closure comprising in its unmounted condition a single polyethylene body having a circular end wall of substantially uniform wall thickness, an enlarging frusto-conical side wall projecting axially from the margin of said end wall, said side wall being of substantially uniform thickness of from .025 to .040 inch for at least the greater part of its distance from said end wall and the angularity of said side wall relative to the axis thereof being from 2.5° to 7.5° and the axial length of said side wall being such that the internal diameter at the rim thereof is from $\frac{1}{16}$ to $\frac{3}{16}$ inch greater than the internal diameter thereof across said end wall and forming inner and outer parallel frusto-conical working faces adapted to engage securely, respectively, with male and female generally cylindrical parts, an annular flange of substantially the same wall thickness as said side wall projecting radially outwardly from the rim of said side wall and an integral annular bead projecting radially inwardly from said side wall closely adjacent the rim thereof.

2. A closure comprising a single polyethylene body having a circular end wall, an enlarging frusto-conical side wall projecting axially from the margin of said end wall, said side wall being of substantially uniform thickness of from .025 to .040 inch and the angularity of said side wall relative to the axis thereof being from 2.5° to 7.5° and forming inner and outer parallel frusto-conical working faces adapted to engage securely, respectively, with male and female generally cylindrical parts, an annular flange projecting radially outwardly from the rim of said side wall, and an integral annular bead projecting radially inwardly from the rim of said side wall, said bead being wedge-shaped in cross section and arranged to provide an abrupt annular shoulder opposing said end wall.

3. A closure comprising a single polyethylene body having a circular end wall and an enlarging frusto-conical side wall projecting axially from the margin of said end wall, said side wall being of substantially uniform thickness of from .025 to .040 inch and the angularity of said side wall relative to the axis thereof being from 2.5° to 7.5° and forming inner and outer parallel frusto-conical working faces adapted to engage securely, respectively, with male and female generally cylindrical parts, an annular flange projecting radially outwardly from the rim of said side wall, and an integral annular bead projecting radially inwardly from the rim of said side wall, said bead being wedge-shaped in cross section and arranged to provide an abrupt annular bead opposing said end wall, said shoulder extending axially toward said end wall from the extremity of the rim of said side wall from 1/8 to 3/16 inch and said abrupt shoulder projecting radially inwardly from said side wall from .007 to 0.10 inch.

JOSEPH R. GRENIER.
ERNEST W. DORMEYER, Jr.

REFERENCES CITED

The following references are of record in the file of this patent:

UNITED STATES PATENTS

| Number | Name | Date |
| --- | --- | --- |
| 601,698 | Backhaus | Apr. 5, 1898 |
| 755,119 | Eckart | Mar. 22, 1904 |
| 929,842 | Eckart | Aug. 3, 1909 |
| 1,430,685 | Sampson | Oct. 3, 1922 |
| 1,556,966 | Selig | Oct. 13, 1925 |
| 1,710,363 | Kramer | Apr. 23, 1929 |
| 1,853,944 | Unke | Apr. 12, 1932 |
| 1,863,081 | Bellows | June 14, 1932 |
| 1,918,987 | Seabold, Sr. | July 18, 1933 |
| 1,934,681 | Damsel | Nov. 14, 1933 |
| 2,031,312 | Horlick, Jr. | Feb. 18, 1936 |
| 2,195,530 | Curtis | Apr. 2, 1940 |
| 2,196,785 | Takiguchi | Apr. 9, 1940 |
| 2,285,220 | Morrell | June 2, 1942 |
| 2,487,400 | Tupper | Nov. 8, 1949 |

FOREIGN PATENTS

| Number | Country | Date |
| --- | --- | --- |
| 583,970 | France | Nov. 12, 1924 |